United States Patent
Feng et al.

(10) Patent No.: US 9,323,011 B1
(45) Date of Patent: Apr. 26, 2016

(54) HYBRID INTEGRATED OPTICAL DEVICE WITH PASSIVELY ALIGNED LASER CHIPS HAVING SUBMICROMETER ALIGNMENT ACCURACY

(71) Applicant: LaXense Inc., Walnut, CA (US)

(72) Inventors: Ningning Feng, Arcadia, CA (US); Xiaochen Sun, Chino Hills, CA (US)

(73) Assignee: LAXENSE INC., Walnut, CA (US)

( * ) Notice: Subject to any disclaimer, the term of this patent is extended or adjusted under 35 U.S.C. 154(b) by 0 days.

(21) Appl. No.: 14/734,857

(22) Filed: Jun. 9, 2015

(51) Int. Cl.
*G02B 6/12* (2006.01)
*G02B 6/26* (2006.01)
*G02B 6/42* (2006.01)
*G02B 6/125* (2006.01)

(52) U.S. Cl.
CPC .......... *G02B 6/4225* (2013.01); *G02B 6/12004* (2013.01); *G02B 6/125* (2013.01); *G02B 6/4202* (2013.01); *G02B 6/4224* (2013.01); *G02B 6/4227* (2013.01); *G02B 6/4238* (2013.01); *G02B 6/4245* (2013.01)

(58) Field of Classification Search
CPC .. G02B 6/12004; G02B 6/125; G02B 6/4202; G02B 6/4224; G02B 6/4225; G02B 6/4227; G02B 6/4238; G02B 6/4245
USPC .......................................... 385/14, 32, 50, 52
See application file for complete search history.

(56) References Cited

U.S. PATENT DOCUMENTS

| | | | |
|---|---|---|---|
| 5,499,312 A | 3/1996 | Hahn et al. | |
| 6,293,688 B1 | 9/2001 | Deacon et al. | |
| 6,391,214 B1 | 5/2002 | Kovacic et al. | |
| 6,654,523 B1 * | 11/2003 | Cole | G02B 6/4225 385/14 |
| 6,693,936 B2 | 2/2004 | Kitaoka et al. | |
| 6,841,860 B2 | 1/2005 | Lee et al. | |
| 7,522,648 B2 | 4/2009 | Park et al. | |
| 8,798,409 B2 | 8/2014 | Pardo et al. | |
| 2002/0197010 A1 | 12/2002 | Kato et al. | |
| 2005/0168752 A1 * | 8/2005 | Bell | G01D 5/35303 356/482 |
| 2007/0092178 A1 * | 4/2007 | Gaebe | G02B 6/421 385/14 |
| 2008/0247705 A1 * | 10/2008 | Francis | G02B 6/422 385/14 |
| 2014/0079082 A1 * | 3/2014 | Feng | H01S 5/101 372/20 |

* cited by examiner

*Primary Examiner* — Ryan Lepisto
(74) *Attorney, Agent, or Firm* — Chen Yoshimura LLP

(57) ABSTRACT

A hybrid optical device includes an optical bench chip, a laser chip with a laser waveguide flip-chip bonded onto the optical bench chip, and an optical waveguide chip with an optical device waveguide disposed adjacent the optical bench chip. The optical bench chip has multiple "U" shaped alignment optical waveguides and the optical waveguide chip has multiple alignment optical waveguides, and the pitches of the various sets of alignment waveguides are different. A misalignment between the laser waveguide and the optical bench chip is compensated for by aligning the optical waveguide chip to different positions of the optical bench chip using the multiple alignment optical waveguides on the optical bench chip and the optical waveguide chip, without turning on the laser, so that the laser waveguide of the laser chip is aligned with the optical device waveguide of the optical device chip.

7 Claims, 5 Drawing Sheets

HYBRID INTEGRATED OPTICAL DEVICE WITH PASSIVELY ALIGNED LASER CHIPS HAVING SUBMICROMETER ALIGNMENT ACCURACY

BACKGROUND OF THE INVENTION

1. Field of the Invention

The invention relates to an optical device with hybrid integrated laser chips and optical waveguide chip. In particular, the invention relates to an optical device using flip-chip method to hybrid integrate one or more laser chips with one optical waveguide chip with the help of optical bench chips with "U" shaped alignment optical waveguides having various waveguide distances.

2. Description of the Related Art

The internet based data applications such as social networks, cloud service, big data analysis and high performance computing have been the driving force to boost the bandwidth requirement to an unprecedented level. With the increase of bandwidth and transmission reach, optical interconnects have become the number one choice in data communication systems. Unlike traditional telecommunication systems, lower cost, more compact and more power efficient optical transceivers or engines are highly demanded in data communications. Integrating multiple optical components or chips such as lasers, modulators, photodetectors etc. to form a hybrid integrated optical device is a promising way to reduce assembling cost and footprint.

Laser chip hybridization usually requires turning on the laser chip so that the device chip can be actively aligned to the laser chip. To build the electric connection, the laser chip has to be fixed in a substrate first and connected to the power supply through wire bonding process. However, it becomes extremely challenging when dealing with multiple laser chips aligning with one optical device chip. In this scenario, the optical device chip needs to be fixed on a substrate first, and then the laser chips have to be actively aligned with the optical device chip one by one. It is very difficult to construct the electrical connections when the laser chips are floating for active alignment process.

Passively placing and bonding laser chips with optical waveguide device chips is highly desirable in such hybrid integrated optical devices for its potentials of low cost assembling for massive volume production. Unlike the mature integrated circuit (IC) fully automated packaging processes, optical integration requires very precise alignment in the range of micrometers or less to form an optical transmission path. It becomes very crucial when dealing with the integration of a laser chip with an optical waveguide chip, where two small waveguides need to be aligned with micrometer or sub-micrometer accuracy.

The alignment accuracy in the direction perpendicular to the chip surface (out-plane) can be controlled well by using a flip-chip bonding process, where one chip is placed upside down onto another chip. However, it is very challenging to achieve higher alignment accuracy in the directions parallel to the surface (in plane). A modern top-of-the-line flip-chip bonder can achieve a +/−0.5 micrometer alignment accuracy, however, in practice, the bonding involving processes such as thin metal solder melting, adhesive curing and etc. inevitably contribute to final alignment error due to physical movement of the chip under temperature, stress and/or phase changes. The final alignment error (3σ confidence interval) is usually +/−2 micrometers or worse from the statistics data. The alignment in in-plane waveguide propagation direction is relatively tolerant and satisfied with this alignment error while the in-plane direction perpendicular to waveguide propagation requires very accurate alignment, for example a sub-micrometer accuracy for small optical waveguides such as those in lasers. To increase the alignment tolerance in this direction, many approaches have been attempted. However, none of them is being adopted in mass production due to their limitations.

SUMMARY OF THE INVENTION

Optical devices according to embodiments of the present invention significantly increase the alignment tolerance to sub-micrometer range in the in-plane direction perpendicular to waveguide propagation during flip-chip bonding process.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a hybrid integrated optical device which includes: at least one optical bench chip having a first side and a second side opposite to the first side and a set of U shaped alignment optical waveguides formed at the first side of the optical bench chip, wherein each of the set of U shaped alignment optical waveguides has a first end and a second end exposed on one end face of the optical bench chip; at least one laser chip having a first side and a second side opposite to the first side and at least one laser waveguide formed at the first side of the laser chip; wherein the laser chip is approximately aligned and flip-chip bonded onto the optical bench chip with the first side of the laser chip facing the first side of the optical bench chip; an optical waveguide chip disposed adjacent the optical bench chip, the optical waveguide chip having a first side and a second side opposite to the first side and at least one optical device waveguide and a first set and a second set of alignment optical waveguides formed at the first side of the optical waveguide chip, wherein each of the alignment optical waveguides has an end exposed on one end face of the optical waveguide chip which faces the one end face of the optical bench chip, wherein the laser waveguide of the laser chip is aligned with the optical device waveguide of the optical waveguide chip, and wherein the end of at least one of the first set of alignment optical waveguides of the optical waveguide chip is aligned with the first end of one of the U shaped alignment optical waveguides of the optical bench chip, the end of at least one of the second set of alignment optical waveguides of the optical waveguide chip is aligned with the second end of the one of the U shaped alignment optical waveguides of the optical bench chip, and the end of at least another one of the first set of alignment optical waveguides of the optical waveguide chip is misaligned with the first end of another one of the U shaped alignment optical waveguides of the optical bench chip, and the end of at least another one of the second set of alignment optical waveguides of the optical waveguide chip is misaligned with the second end of the other one of the U shaped alignment optical waveguides of the optical bench chip.

In another aspect, the present invention provides a method for making a hybrid integrated optical device, which includes: providing at least optical bench chip having a first side and a second side opposite to the first side and a set of U shaped alignment optical waveguides formed at the first side of the optical bench chip, wherein each of the set of U shaped alignment optical waveguides has a first end and a second end exposed on one end face of the optical bench chip; providing at least one laser chip having a first side and a second side opposite to the first side and at least one laser waveguide formed at the first side of the optical chip; providing an optical waveguide chip having a first side and a second side opposite to the first side and at least one optical device waveguide and a first set and a second set of alignment optical waveguides formed at the first side of the optical waveguide chip, wherein each of the alignment optical waveguides has an end exposed on one end face of the optical waveguide chip; approximately aligning and flip-chip bonding the laser chip onto the optical bench chip with the first side of the laser chip facing the first side of the optical bench chip; determining an amount of misalignment of the laser waveguide to a designated location on the first side of the optical bench chip in a direction parallel to the first side of the optical bench chip and perpendicular to a waveguide propagation direction; based on the determined amount of misalignment, selecting one of the set of U shaped alignment optical waveguides on the optical bench chip, a corresponding one of the first set of alignment optical waveguides of the optical waveguide chip and a corresponding one of the second set of alignment optical waveguides of the optical waveguide chip; placing the optical waveguide chip adjacent the optical bench chip wherein the one end of the one end face of the optical waveguide chip faces the one end face of the optical bench chip; aligning the selected one of the set of U shaped alignment optical waveguide on the optical bench with the corresponding selected ones of the first and second sets of alignment optical waveguides on the optical waveguide chip; and fixing the optical bench chip and the optical waveguide chip to each other to form the hybrid integrated optical device.

It is to be understood that both the foregoing general description and the following detailed description are exemplary and explanatory and are intended to provide further explanation of the invention as claimed.

DETAILED DESCRIPTION OF THE PREFERRED EMBODIMENTS

The invention relates to an optical device with hybrid integrated laser chips and optical waveguide chip. In particular, the invention relates to an optical device using flip-chip method to hybrid integrate one or more laser chips with one optical waveguide chip with the help of optical bench chips with "U" shaped alignment optical waveguides having various waveguide distances.

An embodiment of the present invention is described with reference to FIGS. 1A-1B. The hybrid integrated optical device comprises an optical bench with multiple "U" shaped alignment optical waveguides, an etched trench, etched spacers, etched alignment structures, metal traces and micro solders, a flip-chip bonded laser chip with at least one laser waveguide, and an optical chip with at least one optical device waveguide and multiple alignment optical waveguides.

Figure 1A:
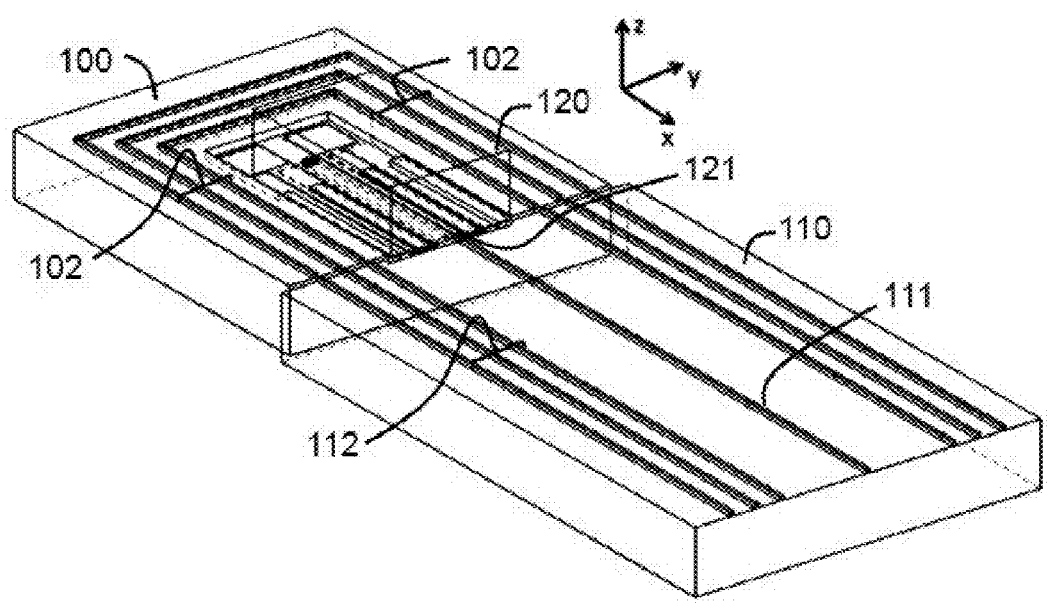
FIG. 1A is a perspective view illustrating a hybrid integrated optical device according to an embodiment of the present invention.
Figure 1B:
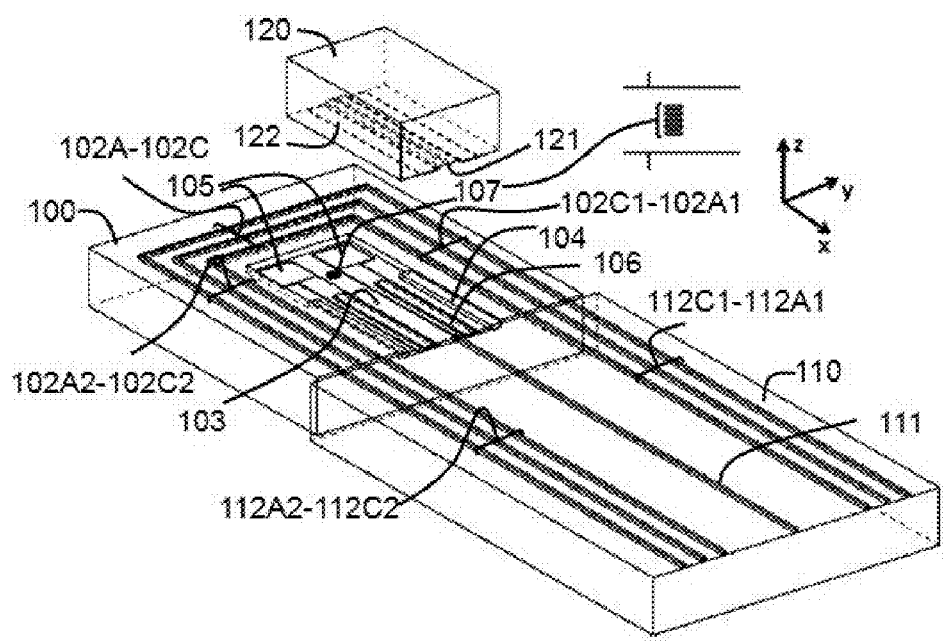
FIG. 1B is an exploded view illustrating the hybrid integrated optical device shown in FIG. 1A.

FIG. 1A is a perspective view illustrating a hybrid integrated optical device according to an embodiment of the present. FIG. 1B is an exploded perspective view of such hybrid optical device. The components are drawn in a way as if they were transparent for the purpose of easy observation of structures behind (structures behind other structures are shown in dashed lines). The hybrid integrated optical device comprises at least one optical bench 100, an optical waveguide device chip 110 and at least one flip-chip bonded laser chip 120.

The optical bench 100 can be made of any semiconductor or insulating materials including, but not limited to, silicon, silica, and indium phosphide. The optical bench 100 has a first side and a second side generally opposite to the first side. The optical bench 100 includes multiple "U" shaped alignment optical waveguides 102A-102C on the first side formed by etching or deposition technologies. The two end sections of the "U" shaped alignment optical waveguides 102A-102C are denoted 102C1-102A2 and 102A2-102C2, which are preferably parallel to each other. The waveguides 102A-102C are made of optical transparent materials including, but not limited to, silicon, silicon nitride, and indium gallium arsenide phosphide. The optical bench 100 further has a trench 103 and multiple spacers 104 formed by etching technologies. The depth of both the trench 103 and spacers 104 are precisely controlled using semiconductor processing techniques. The optical bench 100 further comprises includes metal traces 105 and micro solders 106 in the trench 103 for the purpose of electrically connecting to the flip-chip bonded laser chip 120. The optical bench 100 further includes alignment mark structures 107. The end facets of the waveguides 102A-102C, i.e. the facets located at the near end of the optical bench, are coated with anti-reflection coating to reduce light reflection.

The optical waveguide chip 110 can be made of any semiconductor or insulating materials including, but not limited to, silicon, silica, and indium phosphide. The optical waveguide chip 110 has a first side and a second side generally opposite to the first side. The optical waveguide chip 110 further includes at least one optical device waveguide 111 and multiple alignment optical waveguides 112A1-112C1 and 112C2-112A2 on the two sides of the optical device waveguide 111 on the first side. The alignment optical waveguides 112A1-112C1 and 112C2-112A2 are preferably parallel to each other. The end facets of the waveguides of the optical waveguide chip 110 are coated with anti-reflection coating to reduce light reflection.

The laser chip 120 has a first side and a second side generally opposite to the first side. The laser chip 120 further includes at least one laser waveguides 121 on the first side. The laser chip 120 further includes electrodes 122 to receive external electrical power.

Figure 2A:
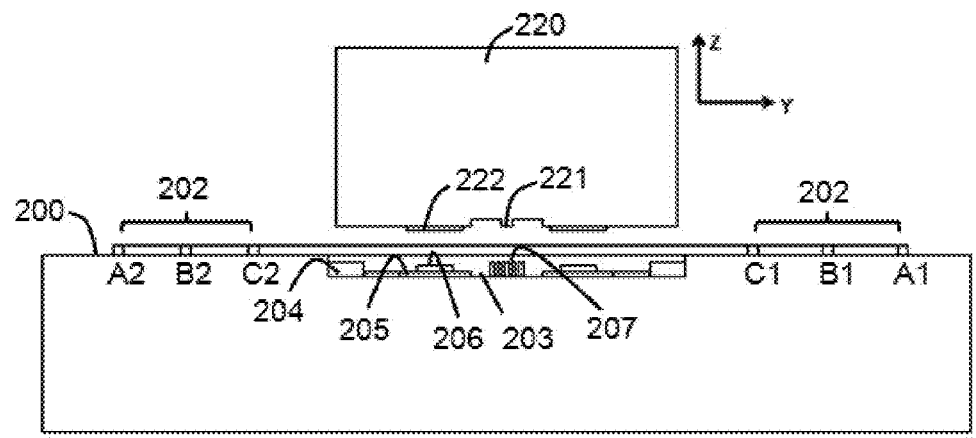
FIG. 2A is a front view illustrating a laser chip flip-chip bonded on an optical bench chip in the hybrid integrated optical device according to an embodiment of the present invention.

FIG. 2A illustrates a front view of the scenario of a laser chip 220 flip-chip bonded to an optical bench chip 200. Note that in FIGS. 2A and 2B, as compared to FIGS. 1A and 1B, like structure are labeled with like reference numerals (for example, the laser chip 220 in FIG. 2A generally corresponds to the laser chip 120 in FIG. 1A, etc.). To clearly illustrate all the structures and relative positions of these structures, the laser chip 220 is intentionally lifted up in the figure. The laser chip 220 is bonded on to the optical bench 200 though a flip-chip process in which the laser chip 220 is flipped thus its first side faces the first side of the optical bench 200. The laser chip 220 is then aligned to the optical bench 200 by comparing center position of the laser waveguide 221 on the first side of the laser chip and alignment mark structures 207 on the first side of the optical bench. The laser chip 220 is then push on to the optical bench 200 while heating up either or both the laser chip 220 and optical bench chip 200. The laser chip 220 is stopped by the spacers 204 from further descending. The micro solders 206 are melted to form electrical connection and mechanical bonding between the metal trace 205 and the electrode 222.

Figure 2B:
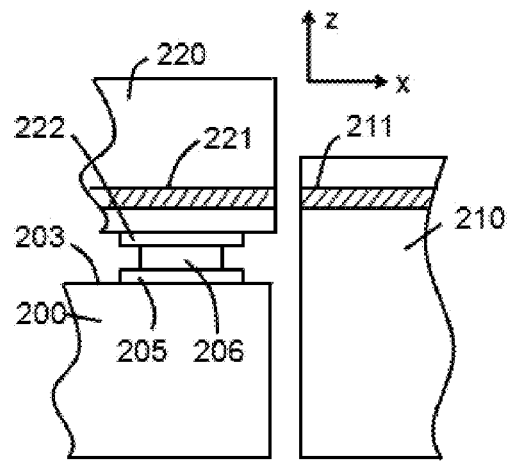
FIG. 2B is a cross-sectional view in the waveguide propagation direction illustrating the out-of-plane alignment between a waveguide on a laser chip bonded on an optical bench chip and a waveguide on the optical waveguide chip of the hybrid integrated optical device shown in FIG. 1A.

FIG. 2B illustrates a cross-sectional view of the bonded structure in the direction parallel to the x-z plane. As shown in FIGS. 1A and 1B, the z direction is perpendicular to the first and second surfaces of the chips 100 and 110; the x direction is in-plane and parallel to the waveguide propagation direction; and the y direction is in-plane and perpendicular to the waveguide propagation direction. The height of the spacers 204 is designed and fabricated to guarantee the mode centers of the laser waveguide 221 and the alignment optical waveguides 202 are in the same horizontal plane (x-y plane). The alignment optical waveguides 202 are designed to have similar optical mode size as the laser waveguide (221). In other words, this approach transfers the challenge of directly aligning the laser waveguide 121 with optical waveguide 111 to the alignment of the alignment optical waveguides 102 and 112. The latter is less challenging because no laser chip needs to turn on, especially in the scenario when multiple laser chips need to align with the optical waveguide chip 110.

Figure 3A:
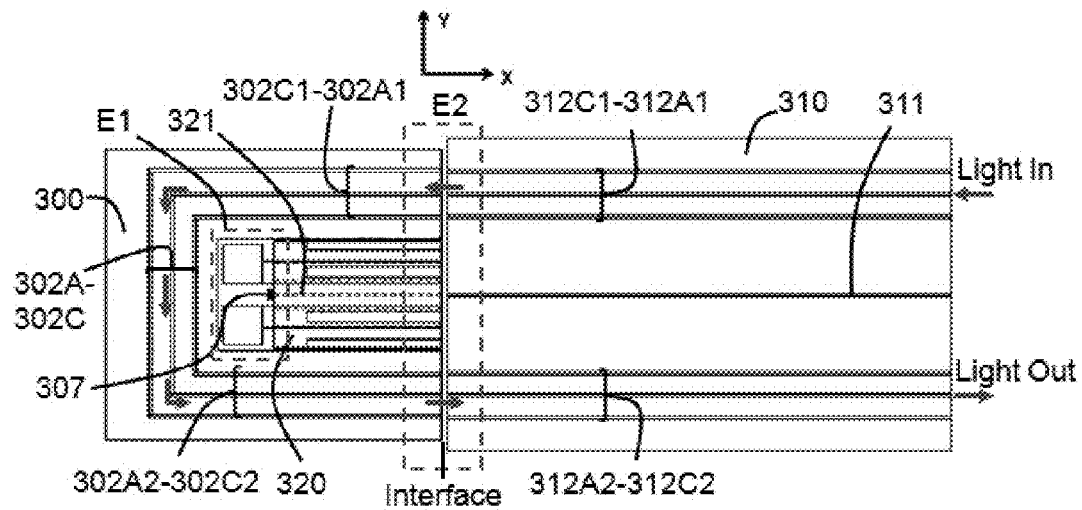
FIG. 3A is a top view illustrating the perfect in-plane alignment between the laser waveguide and the optical device waveguide with the help of an optical bench chip in the scenario when the laser chip is perfectly aligned with the alignment mark structures on the optical bench chip.
Figure 3B:
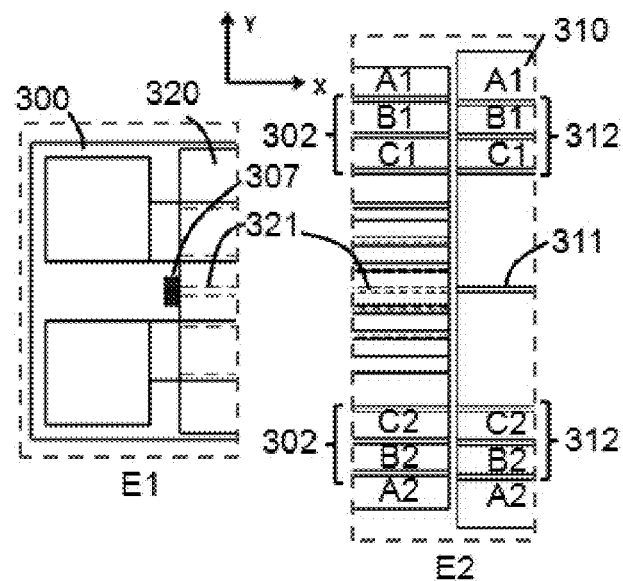
FIG. 3B are enlarged top views of the areas E1 and E2 marked in FIG. 3A illustrating the scenario of perfect alignment scenario shown in FIG. 3A.
Figure 3C:
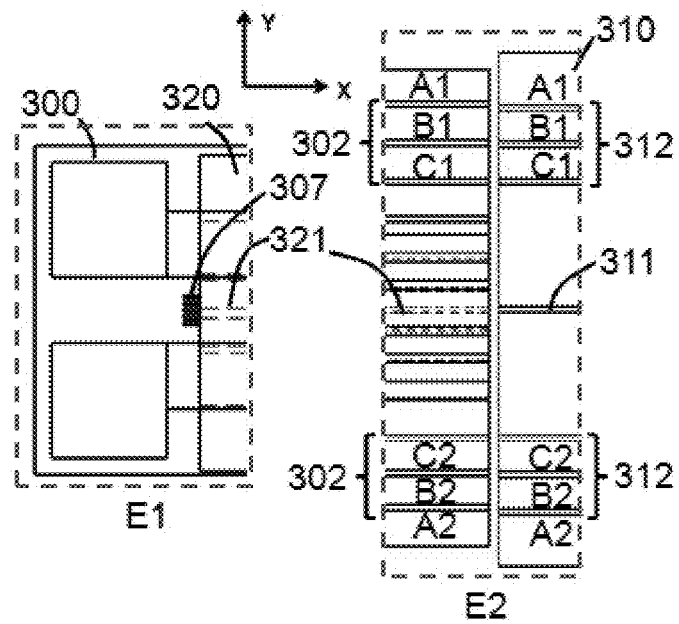
FIGS. 3C-3D are enlarged top views of the areas E1 and E2 illustrating the perfect in-plane alignment between the laser waveguide and the optical device waveguide with the help of an optical bench chip in scenarios when the laser chip is misaligned with the alignment mark structures on the optical bench chip.
Figure 3D:
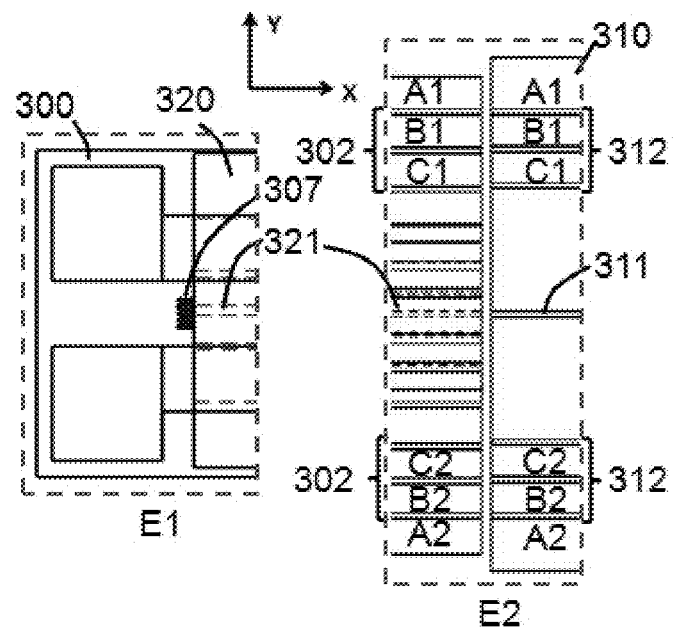

The optical alignment in x-y plane is explained in the top views in FIG. 3A-3D. The alignment in the waveguide propagation direction (x direction) is relatively tolerant while the in-plane direction perpendicular to waveguide propagation (y direction) requires very accurate alignment, for example a sub-micrometer accuracy for small optical waveguides such as those in lasers. FIG. 3B-3D illustrates the enlarged areas of E1 and E2 marked in FIG. 3A with the perfect in-plane alignment between the laser waveguide 321 and the optical device waveguide 311 with the help of an optical bench chip 300. Note that in FIGS. 3A-3D, as compared to FIGS. 1A and 1B and FIGS. 2A and 2B, like structure are labeled with like reference numerals (for example, the laser waveguide 321 in FIGS. 3A-3D generally corresponds to the laser waveguide 121 in FIG. 1A and 221 in FIG. 2A, etc.).

FIG. 3A is a top view illustrating the perfect in-plane (y direction) alignment between the laser waveguide 321 and the optical device waveguide 311 with the help of an optical bench chip 300 in the scenario when the laser chip 320 is perfectly aligned with the alignment mark structures 307 on the optical bench chip 300. To clearly show the relative positions of all related structures (alignment marks and waveguides), the enlarged areas of E1 and E2 marked in FIG. 3A are illustrated. When the laser chip 320 is perfectly aligned with the optical bench chip 300, the laser waveguide 321 is also perfectly aligned with the alignment mark structures 307 (in the middle of the alignment structure) as illustrated in E1 enlarged drawing in FIG. 3B. In such a situation, the center alignment optical waveguide 302B (with end sections 302B1 and 302B2) on the optical bench chip 300 and the alignment optical waveguide pair 312B1/312B2 on the optical waveguide chip 310 are chosen for the final alignment process according to the design. FIG. 3A illustrates the final optical alignment process. Following the arrows, light is input from the right end of the alignment optical waveguide 312B1, passes through the interface of optical bench chip 300 and the optical waveguide chip 310 and enters the section 302B1 of the alignment optical waveguide 302B, and makes a U-turn to the other section 302B2, then passes through the interface again and enters the alignment optical waveguide 312B2 and is finally received by a light detective device at the right end of the waveguide 312B2. By this process, the alignment optical waveguides 312B1-302B-312B2 on the optical bench chip 300 and optical waveguide chip 31 form perfectly aligned a big "U" shaped loop by fine tuning the relative position of the optical bench chip 300 (together with laser chip 320) and the optical waveguide chip 310. The enlarged drawing of E2 in FIG. 3B illustrated the perfectly aligned scenario when the final optical alignment process is done. When the alignment optical waveguide set 312B1-302B-312B2 is aligned, i.e. 302B1 is aligned with 312B1 and 302B2 is aligned with 312B2, the laser waveguide 321 is also aligned with the optical device waveguide 311. This optical alignment process is with sub-micrometer accuracy.

FIG. 3C and FIG. 3D are enlarged top views E1 and E2 illustrating the perfect in-plane (y direction) alignment between the laser waveguide 321 and the optical device waveguide 311 with the help of an optical bench chip 300 in scenarios when the laser chip 320 (for example the center of the laser waveguide 321) is misaligned with the alignment mark structures 307 on the optical bench chip. After the flip-chip bonding process, the misalignment shift between the laser chip 320 and the optical bench chip 300 is read by the relative shift of between the laser waveguide 321 and the alignment mark structure 307 on the optical bench chip 300. The misalignment shift is converted approximately to a digitized value of n×Δ, where n is an integer number and Δ is the minimum resolution of the alignment marks and equal to the pitch difference between the different sets of alignment optical waveguides as will be explained in more detail later. In the scenarios illustrated in FIG. 3C and FIG. 3D, the laser chips 320 shifted down and up by a Δ distance (i.e. n=1), respectively. Correspondingly, alignment optical waveguide sets 312C1-302C-312C2 or 312A1-302A-312A2 are chosen, respectively, for the alignment process similar to the one in the scenario illustrated in FIG. 3A.

To allow the above-described alignment procedure for the different scenarios, the locations and spatial relationship of the straight sections of the alignment optical waveguide 302A1-C1 and 302A2-C2 on the optical bench chip 300 and the alignment optical waveguides 312A1-C1 and 312A2-C2 on the optical waveguide chip 310 are such that (1) when waveguide 302B1 is aligned with waveguide 312B1, waveguide 302B2 is also aligned with waveguide 312B2, but waveguides 302A1, 302C1, 302A2 and 302C2 are misaligned with the corresponding waveguides 312A1, 312C1, 312A2 and 312C2 respectively; (2) from such a position, if the optical waveguide chip 310 is shifted downwards (in the view of FIGS. 3A-3D) by a predetermined amount, waveguide 302C1 will be aligned with waveguide 312C1 and waveguide 302C2 will be aligned with waveguide 312C2, but waveguides 302A1, 302B1, 302A2 and 302B2 will be misaligned with corresponding waveguides 312A1, 312B1, 312A2 and 312B2 respectively; and (3) from the position of (1), if the optical waveguide chip 310 is shifted upwards by the predetermined amount, waveguide 302A1 will be aligned with waveguide 312A1 and waveguide 302A2 will be aligned with waveguide 312A2, but waveguides 302B1, 302C1, 302B2 and 302C2 will be misaligned with corresponding waveguides 312B1, 312C1, 312B2 and 312C2 respectively. Here, "aligned" means aligned within sub-micrometer accuracy (or "perfectly aligned"), and "misaligned" means not aligned to such accuracy.

The above spatial relationship among the alignment optical waveguides can be achieved by adjusting the spacing between the waveguides in each waveguide set. For example, in one implementation, the spacing (pitch) between adjacent waveguides within the waveguide set 312A1-C1 and 312A2-C2 is D, the spacing between adjacent waveguides within the waveguide set 302A1-C1 is D+Δ, and the spacing between adjacent waveguides within the waveguide set 302A2-C2 is D−Δ, where Δ is the predetermined amount of shift referred to above. This can also be viewed as shifting the U shaped waveguide 302A upwards and shifting the U shaped waveguide 302C downwards by the amount Δ.

In alternative implementations, the two sets of alignment optical waveguides 302A1-C1 and 302A2-C2 on the optical bench chip 300 may have a pitch D and the two sets of alignment optical waveguides 312A1-C1 and 312A2-C2 on the optical waveguide device chip 310 may have a pitch D+Δ and D−Δ, respectively, to achieve the same goal that one of the sequences of alignment optical waveguide A, B and C are aligned with each other while the others are misaligned. Further, while the U shaped alignment optical waveguides 302A-C on the optical bench chip 300 are nested within each other in the illustrated embodiments, they may have other configurations, such as side-by-side. It is noted that although in the illustrated embodiments each set of alignment optical waveguides has three waveguides, they may contain more than three waveguides. When 2n+1 alignment optical waveguides are used, and the alignment optical waveguides have pitches D (for 112X1 and 112X2) and D±Δ (for 102X1, 102X2), a misalignment of the laser chip in the amount of nΔ can be accommodated, where n is an integer number.

In any scenarios shown in FIG. 3A-3D, the laser waveguide 321 is always perfectly aligned with the optical device waveguide 311 even though the laser waveguide 321 is only approximately aligned with the alignment mark on the optical bench chip. Since the lasers on the laser chips 320 do not have to be turned on, the hybrid laser chips (with optical bench chips 300) can be moved freely during the alignment process while the optical waveguide device chip 310 is fixed on a substrate and the process is not limited to a single laser chip hybridization.

To summarize, in embodiments of the present invention, the hybrid laser chip (together with the optical bench chip) is optically aligned (without tuning on the laser) with the optical waveguide chip by choosing the right set of the alignment optical waveguide combinations on the optical bench chip and the optical waveguide chip. This method provides a passive alignment process (no laser turned on) for hybrid integration of multiple laser chips with one optical waveguide device chip with sub-micrometer accuracy by using well-designed optical bench chips.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. A hybrid integrated optical device comprising:
at least one optical bench chip having a first side and a second side opposite to the first side and a set of U shaped alignment optical waveguides formed at the first side of the optical bench chip, wherein each of the set of U shaped alignment optical waveguides has a first end and a second end exposed on one end face of the optical bench chip;
at least one laser chip having a first side and a second side opposite to the first side and at least one laser waveguide formed at the first side of the laser chip;
wherein the laser chip is approximately aligned and flip-chip bonded onto the optical bench chip with the first side of the laser chip facing the first side of the optical bench chip;
an optical waveguide chip disposed adjacent the optical bench chip, the optical waveguide chip having a first side and a second side opposite to the first side and at least one optical device waveguide and a first set and a second set of alignment optical waveguides formed at the first side of the optical waveguide chip, wherein each of the alignment optical waveguides has an end exposed on one end face of the optical waveguide chip which faces the one end face of the optical bench chip,
wherein the laser waveguide of the laser chip is aligned with the optical device waveguide of the optical waveguide chip, and
wherein the end of at least one of the first set of alignment optical waveguides of the optical waveguide chip is aligned with the first end of one of the U shaped alignment optical waveguides of the optical bench chip, the end of at least one of the second set of alignment optical waveguides of the optical waveguide chip is aligned with the second end of the one of the U shaped alignment optical waveguides of the optical bench chip, and the end of at least another one of the first set of alignment optical waveguides of the optical waveguide chip is misaligned with the first end of another one of the U shaped alignment optical waveguides of the optical bench chip, and the end of at least another one of the second set of alignment optical waveguides of the optical waveguide chip is misaligned with the second end of the other one of the U shaped alignment optical waveguides of the optical bench chip.

2. The hybrid integrated optical device of claim 1, wherein the optical bench chip comprises:
an etched trench formed at the first side of the optical bench to receive the flip-chip bonded laser chip.

3. The hybrid integrated optical device of claim 2, wherein the etched trench of the optical bench comprises:
a plurality of spacer structures formed on a bottom surface of the etched trench to define a height of the laser chip perpendicular to the first side of the laser chip for flip-chip bonding; and
a plurality of metal traces and a plurality of micro solders disposed on the bottom surface of the etched trench to electrically connect to a plurality of metal electrodes at the first side of the laser chip; and a plurality of alignment mark structures formed on a bottom surface of the etched trench to determine a misalignment of the laser waveguide to a designated location on the first side of the optical bench chip in a direction parallel to the first side of the optical bench and perpendicular to a waveguide propagation direction.

4. The hybrid integrated optical device of claim 1, wherein the laser chip comprises:
a plurality of metal electrodes disposed at the first side of the laser chip to receive external electrical power and signal to operate the laser chip.

5. The hybrid integrated optical device of claim 1, wherein a distance between the first ends of adjacent ones of the set of alignment optical waveguides of the optical bench chip is different from a distance between adjacent ones of the first set of alignment optical waveguides of the optical waveguide chip by a predetermined amount, and a distance between the second ends of adjacent ones of the set of alignment optical waveguides of the optical bench chip is different from a distance between adjacent ones of the second set of alignment optical waveguides of the optical waveguide chip by the predetermined amount.

6. A method for making a hybrid integrated optical device, comprising:
providing at least optical bench chip having a first side and a second side opposite to the first side and a set of U shaped alignment optical waveguides formed at the first side of the optical bench chip, wherein each of the set of U shaped alignment optical waveguides has a first end and a second end exposed on one end face of the optical bench chip;
providing at least one laser chip having a first side and a second side opposite to the first side and at least one laser waveguide formed at the first side of the optical chip;
providing an optical waveguide chip having a first side and a second side opposite to the first side and at least one optical device waveguide and a first set and a second set of alignment optical waveguides formed at the first side of the optical waveguide chip, wherein each of the alignment optical waveguides has an end exposed on one end face of the optical waveguide chip;
approximately aligning and flip-chip bonding the laser chip onto the optical bench chip with the first side of the laser chip facing the first side of the optical bench chip;
determining an amount of misalignment of the laser waveguide to a designated location on the first side of the optical bench chip in a direction parallel to the first side of the optical bench chip and perpendicular to a waveguide propagation direction;
based on the determined amount of misalignment, selecting one of the set of U shaped alignment optical waveguides on the optical bench chip, a corresponding one of the first set of alignment optical waveguides of the optical waveguide chip and a corresponding one of the second set of alignment optical waveguides of the optical waveguide chip;
placing the optical waveguide chip adjacent the optical bench chip wherein the one end of the one end face of the optical waveguide chip faces the one end face of the optical bench chip;
aligning the selected one of the set of U shaped alignment optical waveguide on the optical bench with the corresponding selected ones of the first and second sets of alignment optical waveguides on the optical waveguide chip; and
fixing the optical bench chip and the optical waveguide chip to each other to form the hybrid integrated optical device.

7. The method of claim 6, wherein a distance between the first ends of adjacent ones of the set of alignment optical waveguides of the optical bench chip is different from a distance between adjacent ones of the first set of alignment optical waveguides of the optical waveguide chip by a predetermined amount, and a distance between the second ends of adjacent ones of the set of alignment optical waveguides of the optical bench chip is different from a distance between adjacent ones of the second set of alignment optical waveguides of the optical waveguide chip by the predetermined amount.

* * * * *